United States Patent [19]

Emery

[11] 4,361,938
[45] Dec. 7, 1982

[54] JAMMING CLEAT

[76] Inventor: Howard Emery, 17 Herns La., Welwyn Garden City, England

[21] Appl. No.: 132,341

[22] Filed: Mar. 20, 1980

[51] Int. Cl.³ .............................................. F16G 11/04
[52] U.S. Cl. ...................................... 24/130; 114/218
[58] Field of Search ............................ 24/130; 114/218

[56] References Cited

U.S. PATENT DOCUMENTS

| 3,574,900 | 4/1971 | Emery | 24/130 |
| 3,812,811 | 5/1974 | Rodriguez | 24/130 X |
| 4,084,532 | 4/1978 | Feder | 114/218 |
| 4,092,941 | 6/1978 | Gryglas | 114/218 |
| 4,120,077 | 10/1978 | Fink | 24/130 |

FOREIGN PATENT DOCUMENTS

| 1010686 | 11/1965 | United Kingdom | 24/130 |
| 1191950 | 5/1970 | United Kingdom | 114/218 |
| 1371646 | 10/1971 | United Kingdom | 114/218 |

Primary Examiner—James T. McCall
Assistant Examiner—Peter A. Aschenbrenner

[57] ABSTRACT

A jamming cleat has a groove to receive and grip a rope. At least a part of the depth of the groove has facing side walls each of which is formed with a plurality of ridges. The edges are inclined upwardly from the base of the groove towards one end of the groove, and the crests of the ridges on each side of the groove lie generally in one common ridge crest plane. The ridge crest planes converge downwardly towards the bottom of the groove and diverge lengthwise of the groove away from the said one end of the groove. In use a rope or cord is laid in the groove and pulled through the groove in a direction away from the said one end of the groove. The ridges draw the rope down towards the bottom of the groove so as to jam the rope in the groove. The extent to which the rope is drawn down into the groove increases progressively away from the said one end but the rope is gripped generally uniformly along the length of the groove because of the divergence of the ridge crest planes.

14 Claims, 6 Drawing Figures

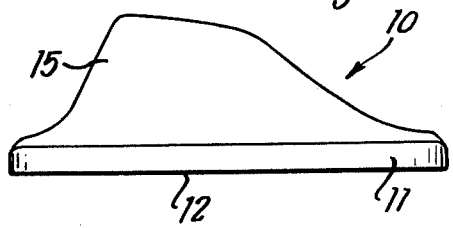
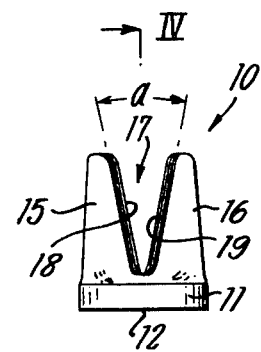
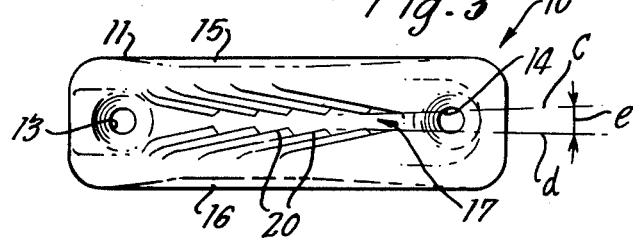
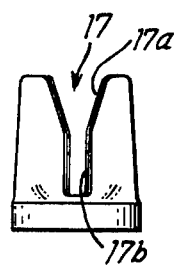
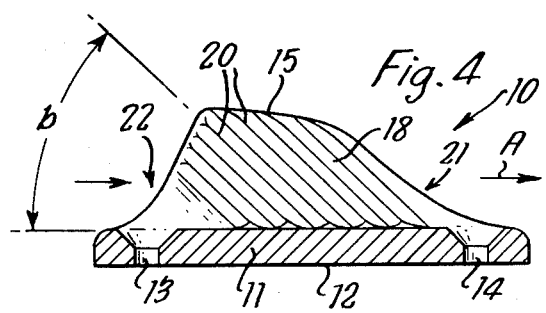
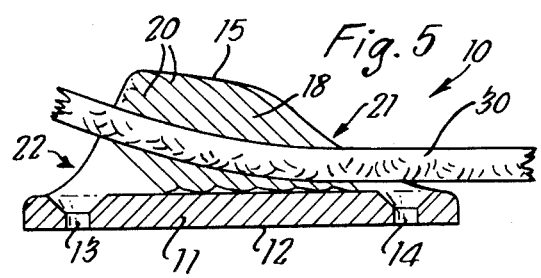

JAMMING CLEAT

BACKGROUND TO THE INVENTION

The present invention relates to an improved jamming cleat for releasably holding ropes, cords, cables and similar elongate articles.

Jamming cleats for holding ropes are well known and there is described in U.S. Pat. No. 3,574,900 of Reginald J. Emery a jamming cleat having a groove opening out of one side of the cleat and extending over the whole length of the cleat, the groove having opposed internal faces which converge towards the bottom of the groove and ridges on each face, the ridges on both faces being inclined to the base of the groove upwardly from one end of the groove. The internal faces of this known cleat are uniformly spaced along the length of the groove and in use a rope is inserted laterally into the mouth of the groove and the rope is pulled through the cleat so that the ridges draw the rope downwardly towards the bottom of the groove where it is jammed tightly in the cleat.

This type of cleat has proved satisfactory in many applications but I have found that it has limitations both in the range of rope diameters which a cleat of any given size will grip effectively and in the pulling force which the cleat can withstand without failure. When this known type of cleat is loaded the front ridges normally provide most of the grip on the rope. As the loading increases the rope tends to stretch and each tooth takes progressively less load, causing the front end of the rope to be pulled downwardly into the groove further than the rear end of the rope. As a result of these factors, the load applied to the cleat is always taken mainly by the first one or two ridges. This limits the maximum loading of a cleat of a given size and the range of rope diameters which any given cleat can grip effectively. It also creates a localised strain on the rope so that the maximum loading that a given rope can withstand is much less than it would be if the loading was spread over a greater length of the rope.

I have now found that, if the cleat is so designed that the crests of the ridges diverge lengthwise of the groove from the rear end of the groove towards the front end of the groove the rope will be gripped more uniformly along the length of the groove by a greater number of ridges thereby substantially increasing the holding power of the cleat and the range of diameters of rope which a given size of cleat will grip effectively and also spreading the load on the rope itself.

SUMMARY OF THE INVENTION

The present invention provides a jamming cleat having a groove to receive and grip a rope, at least a part of the depth of the groove having facing side walls each of which is formed with a plurality of ridges which are inclined upwardly from the base of the groove towards one end of the groove, wherein the crests of the ridges on each side of the groove lie generally in one ridge crest plane, which said ridge crest planes converge downwardly towards the bottom of the groove, wherein the said ridge crest planes diverge lengthwise of the groove away from the said one end of the groove.

Preferably the ridge crest plane diverge lengthwise of the groove away from the said one end of the groove at an angle lying within the range 30 minutes to 8 degrees and in the preferred embodiment this angle is approximately 3°.

DESCRIPTION OF THE DRAWINGS

FIG. 1 is a side elevation of a cleat made in accordance with the present invention;

FIG. 2 is an end view of the cleat shown in FIG. 1;

FIG. 3 is a plan view of the cleat shown in FIGS. 1 and 2;

FIG. 4 is a section taken on the line IV—IV of FIG. 2;

FIG. 5 is a section similar to FIG. 4 showing a rope jammed within the cleat;

FIG. 6 is a section similar to FIG. 2 showing one alternative groove shape.

DESCRIPTION OF A PREFERRED EMBODIMENT

In the drawings a cleat is indicated generally at 10. The cleat 10 is made as an integral injection moulding from a synthetic plastics material such as nylon. Alternatively the cleat 10 may be made from aluminium as a pressure die casting. Other materials and methods of manufacture may also be suitable and the present invention is not limited to any particular material or method of manufacture.

The thusly unitary and integral cleat 10 comprises a base 11 having a substantially flat under surface 12 and two holes 13 and 14 to receive screws or rivets for mounting the cleat 10 on a support surface. The manner in which the cleat is mounted on a support surface does not form a part of the present invention and may be modified to suit the particular application of the cleat or alternatively the cleat may form an integral part of another component. The base 11 is generally elongate and two stationary side walls 15 and 16 extend upwardly from the base 11 along the longer sides of the base. The side walls 15 and 16 define a stationary groove 17 which is V-shaped in cross-section as can be seen best from FIG. 2. The groove is rectilinear and has a radiused bottom to reduce the danger of the cleat being split longitudinally when a rope is jammed into the groove.

The groove 17 has opposed internal side surfaces 18 and 19 which converge downwardly towards the bottom of the groove to form a V-angle 'a' of approximately 15°. The V-angle of the cleat is not critical and may vary in dependence upon the purpose of the cleat, the material of the rope or cord to be gripped and the diameter of the rope or cord, but will generally be within the range of 5° to 40°. It is also envisaged that the V-angle may change over the depth of the groove or alternatively that the groove may be V-shaped in cross-section as shown in FIG. 6, having an upper portion 17a in which the side walls converge downwardly and a lower portion 17b in which the side walls are parallel.

Each side surface 18 and 19 is formed with a plurality of similar ridges 20. The ridges 20 on each face are rectilinear and parallel and are inclined to the bottom of the groove upwardly from the front end 21 of the groove towards the rear end 22 of the groove at a ridge angle 'b' of approximately 45°. The ridge angle 'b' may vary depending upon the usage of the cleat, the sharper the angle the better the grip on the rope, but it will generally be in the region of 20° to 60°. The ridge angle may also change along the length of the ridges and the ridges may be curved rather than linear.

The ridges 20 are normally of constant depth, as shown, but they may decrease in depth from the bottom to the top of the groove. However, all of the ridges are similar so that the crests of the ridges on each side of the groove lie approximately in one correspondingly stationary plane. These planes, which are referred to as the ridge planes are indicated in FIG. 3 at 'c' and 'd' respectively. The correspondingly stationary ridge planes 'c' and 'd' diverge in the longitudinal direction of the groove away from the rear end 22 of the groove towards the front end 21. The angle of divergence 'e' in the longitudinal direction, which is referred to as the groove and which is a correspondingly fixed angle taper of the cleat, is approximately 3° in the illustrated embodiment but may be within the range of 30' to 8°.

To use the cleat 10, a rope 30, which is shown in FIG. 5 in position within the cleat 10, is laid in the groove 17 and then drawn in the direction of the arrow A towards the front end 21 of the groove. The ridges 20 which then grip the rope as it enters the groove, direct the rope along the line of the ridges towards the bottom of the groove. The rope thus becomes firmly jammed in the groove and any further pulling force on the cord in the direction of the arrow A will only cause the rope to jam more tightly in the groove.

As the rope 30 is pulled through the cleat it will normally be drawn downwardly further adjacent the front end 21 than the rear end 22 of the groove. The rope will thus tend to take up an inclined position extending upwardly from the front end towards the rear end of the groove as shown in FIG. 5. However, because the ridge planes 'c' and 'd' of the groove and thus the working crest surfaces of the ridges diverge longitudinally from the rear end 22 towards the front end 21 of the groove the rope will be gripped as tightly by the ridges adjacent the rear end of the groove as it is by the ridges adjacent the front end of the groove, even though the rope is jammed further down at the front end than the rear end of the groove.

It will be appreciated that the number of ridges which effectively grip the rope and the position of these ridges along the length of the groove will depend upon the thickness and the nature of the rope, the groove taper and the position which the rope takes up within the groove. These variables mean that the optimum groove taper will vary in dependance on the particular application of any given cleat and the condition in which it will be used. However, in every case we have found that even a small groove taper has shown a striking increase in the performance of the cleat.

Tests carried out with a 10 mm. diameter 8 plait polyester rope with cleats having a groove taper from 0° to 8° gave the following results:

| Groove Taper | Maximum Load (Kg) | Area of rope fracture in relationship to cleat ridges |
| --- | --- | --- |
| 0° | 636 | Front 2 ridges |
| 30' | 749 | Front 2 ridges |
| 1° | 790 | Front 3 ridges |
| 2° | 854 | Front 4 ridges |
| 3° | 908 | All 6 ridges |
| 4° | 835 | Rear 4 ridges |
| 5° | 808 | Rear 2 ridges |
| 6° | 763 | Rear 2 ridges |
| 8° | 681 | Rear 2 ridges |

While any degree of groove taper however small will give an improved performance it will be seen that the optimum results were obtained with a longitudinal groove taper of 3°. With this degree of groove taper a more uniform grip is achieved on the rope throughout the length of the cleat and consequently the rope will withstand a much higher loading. The groove taper also enables a cleat of a given size to effectively grip a smaller diameter rope than was hitherto possible, thereby increasing the flexibility and range of the cleat. It also spreads the load on the cleat itself thereby increasing the loading that can be applied by a given cleat before cleat failure occurs.

What I claim is:

1. A jamming cleat having a stationary groove to receive and grip a rope, at least a part of the depth of the groove having correspondingly stationary facing side walls each of which is formed with a plurality of ridges which are inclined upwardly from the base of the groove towards one end of the groove, the crests of the ridges on each side of the groove lying generally in one common correspondingly stationary ridge crest plane, which corresponding stationary ridge crest planes converge downwardly towards the bottom of the groove, wherein the said stationary ridge crest planes diverge at a fixed angle lengthwise of the groove away from the said one end of the groove to thereby more uniformly grip a rope extending lengthwise within the groove and downwardly from the said one end of the groove.

2. A jamming cleat as claimed in claim 1 wherein the said ridge crest planes diverge lengthwise of the groove away from the said one end of the groove at an angle lying within the range 30 minutes to 8 degrees.

3. A jamming cleat as claimed in claim 1 wherein the said ridge crest planes diverge lengthwise of the groove away from the said one end of the groove at an angle lying within the range of 1 degree to 4 degrees.

4. A jamming cleat as claimed in claim 1, wherein said ridge crest planes diverge lengthwise of the groove away from the said one end of the groove at an angle lying within the range of 2 degrees to 3 degrees.

5. A jamming cleat as claimed in claim 1, wherein the groove is generally V-shaped in cross-section.

6. A jamming cleat as claimed in claim 1, wherein the said ridge crest planes converge downwardly at an angle within the range of 5 degrees to 40 degrees.

7. A jamming cleat as claimed in claim 6, wherein the said ridge crest planes extend downwardly in parallel adjacent the bottom of the groove.

8. A jamming cleat as claimed in claim 1, wherein the ridges on each side wall are inclined upwardly from the bottom of the groove at an angle of approximately 45 degrees.

9. A jamming cleat as claimed in claim 1, wherein the ridges on each wall are linear and parallel.

10. A jamming cleat as claimed in claim 1, wherein the ridges on each wall are curved.

11. A jamming cleat as claimed in claim 1, wherein the ridges on each wall are similar.

12. A jamming cleat as claimed in claim 1, wherein the cleat includes a base portion having apertures for mounting the cleat on a support surface.

13. A jamming cleat as claimed in claim 1, wherein the cleat is provided with means for connecting the cleat to a support therefor.

14. A unitary and integral jamming cleat having a stationary groove to receive and grip a rope, at least a part of the depth of the groove having correspondingly stationary facing side walls each of which is formed with a plurality of edges lying generally parallel and inclined upwardly from the base of the groove towards one end of the groove, the crests of the ridges on each side of the groove lying approximately in one common correspondingly stationary ridge crest plane, which corresponding stationary ridge crest planes converge downwardly towards the bottom of the groove at an angle within the range of 5 degrees to 40 degrees, wherein the said stationary ridge crest planes diverge lengthwise of the groove away from the said one end of the groove to form a fixed angle within the range of 1 degree to 4 degrees, whereby a rope laid lengthwise through the groove and pulled in a direction away from the said one end of the groove so as to be drawn downwardly towards the base of the groove by the ridges and jammed within the groove, will be drawn down progessively further into the groove from the said one end of the groove towards the other end of the groove but will be substantially uniformly gripped by the ridges along the length of the groove by virtue of the divergence of the said ridge crest planes.

* * * * *